Nov. 23, 1965  H. GERSTENHAUER  3,218,874
LEVER SYSTEM COMPRISING TWO LEVERS

Filed Dec. 12, 1961  3 Sheets-Sheet 1

FIG. I.

HELMUT GERSTENHAUER
INVENTOR.

BY
Hall, Pollock + Vonde Sande
ATTORNEYS

United States Patent Office 3,218,874
Patented Nov. 23, 1965

3,218,874
LEVER SYSTEM COMPRISING TWO LEVERS
Helmut Gerstenhauer, Koblenz, Germany, assignor to Messerschmitt A.G., Augsburg, Germany, a corporation of Germany
Filed Dec. 12, 1961, Ser. No. 158,799
Claims priority, application Germany, Jan. 18, 1961, M 47,710
11 Claims. (Cl. 74—110)

This invention relates to a lever system comprising two levers for the transmission of signals, more particularly for aircraft control systems, the output signal being in a variable ratio to the input signal.

The ratio of output magnitude to input magnitude cannot be varied in a simple lever. In complex equipment of the kind used in aircraft control systems, it is often necessary for the ratio of an output signal to an input signal to be variable and to be adapted to be varied correspondingly as operating conditions change. The required variation in transmission ratio is from 0 to the maxium value permitted by the length of the lever arms.

Levers are known in which some variation of the transmission ratio can be provided by lever arms which can be adjusted in length—i.e., which can be moved one inside another. However, a disadvantage of such devices is that all the adjusting elements, for instance, bevel gears with spindles, engage with the fulcrum and with the arm of the lever and therefore require very complex and physically extensive mechanical constructions. Nor can devices of this kind vary the transmission ratio right down to zero since the residual length of the shortened lever arm means that there is an irreducible value of the said ratio.

The main object of the present invention is to be obviate these disadvantages.

According to the present invention, at a central position—i.e., at the point of intersection of the rotational axis and longitudinal axis of a double-armed lever—means are provided to which a single-armed lever is articulated so as to be pivotable in the plane passing through such rotational axis and longitudinal axis, by an amount of up to 90° away from the said longitudinal axis—i.e., to be pivotable towards the rotational axis of the double-armed lever, the double-armed lever having its mounting outside the central position and so cooperating with the single-armed lever as to provide the effect of a single double-armed lever of variable lever arm length.

The lever system, according to the invention, comprises a bearing block having in the same plane two bearings offset by 90° from one another, the axes of the bearings intersecting one another at the central position, whilst an annular arm of a double-armed lever is so mounted in one bearing on one side thereof by means of a bearing stud extending radially outwards from such annular arm that the longitudinal axis of the double-armed lever, the straight arm of which is disposed on the outside of the annular arm so as to extend radially and perpendicularly to the rotational axis of such annular arm, always passes through the central position, whatever the position of the double-armed lever may be. A guide track in which the single-armed lever is guided by means of a spherically mounted ring is provided in that generated part of the annular arm which is opposite the said bearing stud and is disposed in the plane which passes through the rotational axis and longitudinal axis of the double-armed lever. The other bearing of the bearing block receives a forked pin which is formed, on the side remote from the central position, as a mounting pin for a linkage adapted to transmit a torque. The single-armed lever is articulatedly mounted in the fork end of the forked lever, near the said central position, so that the longitudinal axis of the single-armed lever always passes through the central position, whatever the position of the single-armed lever may be, and, being guided in the guide track of the annular arm, can be pivoted away from the longitudinal axis of the double-armed lever towards the rotational axis of the annular arm.

The said guide track can extend over a segment of 90° or more in accordance with the required operative relationship between the output signal and the input signal. The guide track can extend over any desired curve appropriate for the required operative relationship of the output signal to the input signal.

A preferred embodiment of the invention is illustrated by way of example in the accompanying drawings wherein.

Figure 1:
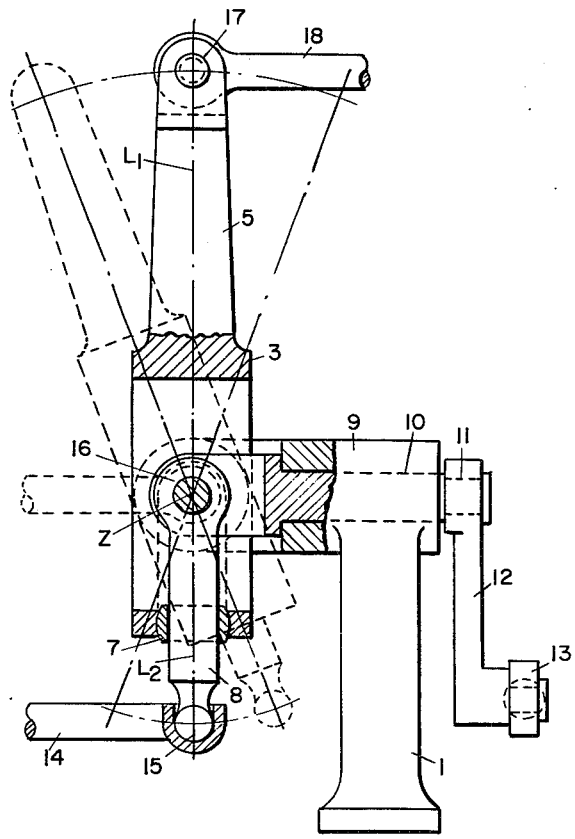
FIG. 1 is a front view of a lever system comprising two levers.

Referring to the drawings, there is shown a bearing block 1 having two bearings 2, 9 which are disposed in the same plane as one another but are offset from one another by 90°, the axes of the bearings 2, 9 cutting one another in such plane at a central position Z. A double-armed lever 3, 5, comprising a lever arm 5 and a cylindrical annular arm 3, is mounted on one side in the bearing 2 by means of a bearing stud 4 which extends radially from the outside of the arm 3, the longitudinal axis $L_1$ of the lever 3, 5 always passing through the central position Z whatever the position of the lever 3, 5. The rotational axis D of the double-armed lever 3, 5 also passes through the central position Z but perpendicularly to the longitudinal axis $L_1$.

A guide track 6 for guiding a single-armed lever 8 is provided in that generated part of the annular arm 3 which is opposite the bearing stud 4 and the lever arm 5, the track 6 being disposed in the plane which passes through the rotational axis D and the longitudinal axis $L_1$ of the two-armed lever 5. The bearing 9 receives a forked pin 10 to which linkage 12, 13 is articulated at 11, such linkage being adapted to transmit a torque to the pin 10. The single-armed lever 8 is so pivotally mounted in the fork end 16 of the pin 10 that the longitudinal axis $L_2$ of the lever 8 always passes through the central position Z whatever the position of the lever 8 may be. The lever 8 is guided in the track 6 by means of a spherically mounted ring 7 and can be pivoted out of the axis $L_1$ into the axis D of the arm 3. Disposed at the free outer end of the lever 8 is a ball joint 15 for connection to linkage 14.

A description will now be given of the operation of the exemplary lever system illustrated in the drawings.

An input signal transmitted through a linkage 18 and an articulation 17 is imparted to the arm 5 of the double lever 3, 5 which rotates around the rotational axis D in accordance with the magnitude of the input signal. The magnitude corresponding to the input value of the signal is transmitted by the lever 3, 5 through the guide track 6 to the single-armed lever 8 mounted in the spherical ring 7, the lever 8 transmitting the signal value through the ball joint 15 to the linkage 14.

Figure 2:
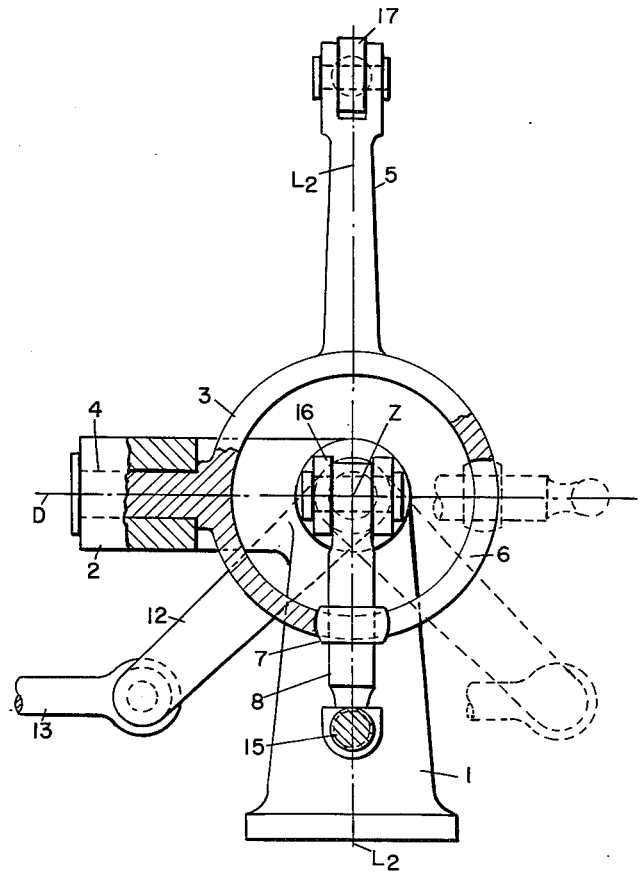
FIG. 2 is a side elevation of the lever system.
Figure 3:
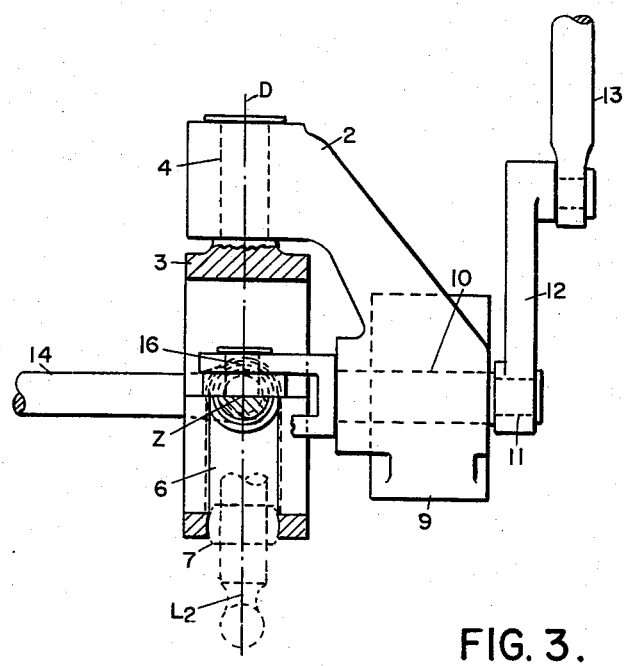
FIG. 3 is a plan view.

That position of the lever system shown in solid line in FIGS. 1 to 3 and in which the longitudinal axis $L_1$ of the double-armed lever 3, 5 coincides with the longitudinal axis $L_2$ of the single-armed lever 8 and in which both such levers rotate around the common rotational axis D, corresponds to transmission wih maximum transmission ratio of output signal to input signal, since the signals are to one another as the distances of the articulations 15, 17 are to the central position Z.

To vary the transmission ratio, a torque is applied through the linkage 12, 13 to the pin 10 so that the single-armed lever 8 is moved out of its position flush with the longitudinal axis $L_1$ into a position in which the lever 8 can include any angle of from 0 to 90° with the axis $L_1$.

For an input signal of given value, the effect on the output signal of pivoting the lever 8 in this way is the same as shortening the single-armed lever 8, for the effective lever length of the single-armed lever 8 is equal to the perpendicular projection thereof on to the longitudinal axis $L_1$ of the double-armed lever 3, 5. Consequently, the output-to-input-signal transmission ratio decreases in proportion as the single-armed lever 8 is pivoted towards the rotational axis D. When the lever 8 has been pivoted so far that its axis $L_2$ coincides with the rotational axis D (position shown in chain-dotted lines), the lever 8 ceases to deliver any signal at its articulation 15, for whatever the input signal may be, the lever 8 merely rotates around its axis $L_2$ but does not pivot around the rotational axis D.

I claim:

1. A lever system for the transmission of signals comprising, a first lever pivotable about an axis, a second lever also pivotable about said axis, first pivotal support means operatively connected to said first lever for permitting pivoting of said first lever about said axis, second pivotal support means operatively connected to said second lever for permitting pivoting of said second lever about said axis, means mechanically coupling said first and second levers for pivoting said second lever about said axis in response to pivoting of said first lever about said axis, said coupling means permitting at least one of said levers to pivot also in a plane containing said one lever and also said axis so as to permit an adjustment of the angle between said one lever and said axis, means operatively connected to said coupling means for adjusting the angle of said one lever relative to said axis, input means coupled to said first lever at a point remote from said axis for imparting pivotal movement to said first lever, and output means coupled to said second lever at a point remote from said axis and responsive to pivoting of said second lever.

2. The lever system of claim 1 wherein said one lever is said second lever.

3. The lever system of claim 1 wherein the axis of said one lever is pivotable in said plane into coincidence with said axis.

4. The lever system of claim 1 wherein the axis of said one lever is pivotable in said plane from a position substantially at right angles to said axis to a position substantially coincident with said axis.

5. The lever system of claim 1 in which said input and output means each comprise a link pivotally attached to the respective first and second lever.

6. The lever system of claim 1 wherein the axis of said one lever is pivotable in said plane about a pivot point lying along said axis.

7. The lever system of claim 6 in which said adjusting means includes a pivotable shaft intersecting said one lever at said pivot point on said axis, and means coupling said shaft to said one lever at said point of intersection for pivoting said one lever in said plane in response to rotation of said shaft.

8. The invention as defined in claim 7 wherein the axis of said shaft is substantially perpendicular to said axis and said means coupling said shaft to said one lever includes pivotal means permitting pivoting of said one lever about said axis.

9. A variable ratio transmission apparatus comprising, a first member pivotable about a fixed axis, pivotal support means operatively connected to said first member for permitting pivoting thereof about said axis, a signal input member pivotably attached to said first member at a point remote from said axis to provide pivoting of said first member about said axis by a corresponding amount in response to translational movement of said input member by a given amount, a second member extending outwardly from said axis, pivotal support means for said second member permitting pivoting of said second member in any direction about a point on said axis, said first member including support means for said second member at a point remote from said axis and constraining pivoting of said second member only about said axis while permitting pivoting of said second member in a plane including said axis, means operatively connected to said second member for adjusting the pivotal position of said second member in said plane, and a signal output member pivotally attached to said second member at a point remote from its said pivot on said axis, whereby the effective distance of said pivot point of said output member from said axis is adjustable to thereby vary the translational motion experienced by said output member in response to said given amount of translational motion of said input member.

10. The apparatus of claim 9 wherein said first member includes a cylindrical annular member and a radially extending lever and bearing means for pivoting said annular member about its diameter which constitutes said axis, said annular member having an elongate annular slot through which said second member extends radially outward from the center of said annular member.

11. The apparatus of claim 10 in which said slot is of sufficient length to permit pivoting of said second member in a plane parallel to the plane of said annular member from a position where said second member extends outwardly substantially parallel to said radially extending lever to a position substantially at right angles to said radially extending lever and coincident with said diametrical axis.

References Cited by the Examiner

UNITED STATES PATENTS

| | | | |
|---|---|---|---|
| 2,191,842 | 2/1940 | Back | 74—471 |
| 2,700,106 | 1/1955 | Taylor | 74—471 |

BROUGHTON G. DURHAM, *Primary Examiner.*